United States Patent
Levy et al.

(10) Patent No.: US 7,155,123 B2
(45) Date of Patent: Dec. 26, 2006

(54) METHOD AND APPARATUS FOR LOCATING FAULTS IN AN OPTICAL NETWORK

(75) Inventors: David S. Levy, Freehold, NJ (US); Peter H. Mitev, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 718 days.

(21) Appl. No.: 10/142,475

(22) Filed: May 10, 2002

(65) Prior Publication Data

US 2003/0210908 A1 Nov. 13, 2003

(51) Int. Cl.
*H04B 10/08* (2006.01)

(52) U.S. Cl. .......................... 398/33; 398/10; 398/14; 398/17

(58) Field of Classification Search .............. 398/1, 398/7, 10, 14, 17, 33, 18, 20, 58, 21; 370/242, 370/395.21
See application file for complete search history.

(56) References Cited

U.S. PATENT DOCUMENTS

| | | | | |
|---|---|---|---|---|
| 6,115,157 A | * | 9/2000 | Barnard et al. ................ 398/1 |
| 6,690,649 B1 | * | 2/2004 | Shimada ..................... 370/238 |
| 6,697,577 B1 | * | 2/2004 | Li et al. ..................... 398/202 |
| 6,937,821 B1 | * | 8/2005 | Heath et al. .................. 398/38 |
| 2002/0044322 A1 | * | 4/2002 | Blumenthal et al. ........ 359/161 |
| 2002/0101631 A1 | * | 8/2002 | Gerstel et al. .............. 359/110 |
| 2003/0056157 A1 | * | 3/2003 | Fala et al. .................. 714/700 |
| 2003/0151801 A1 | * | 8/2003 | Jayaram et al. .......... 359/341.1 |
| 2003/0204595 A1 | * | 10/2003 | Lev et al. ................... 709/226 |
| 2004/0052521 A1 | * | 3/2004 | Halgren et al. ............... 398/19 |
| 2004/0208501 A1 | * | 10/2004 | Saunders et al. ............... 398/9 |

\* cited by examiner

*Primary Examiner*—Dalzid Singh

(57) ABSTRACT

Method and apparatus for fault localization in an optical network using time trend correlation of end node performance parameters and intermediate node performance parameters, such as QoS and quasi-Q factors, respectively. The method and apparatus are bit-rate and protocol independent, enabling testing for each channel of a diverse dense wavelength division multiplexed traffic system using a single set of hardware.

25 Claims, 3 Drawing Sheets

METHOD AND APPARATUS FOR LOCATING FAULTS IN AN OPTICAL NETWORK

TECHNICAL FIELD

The invention relates to the field of communication systems and, more specifically, to fault localization within optical communication systems such as wavelength division multiplexed (WDM) optical line systems (OLS).

BACKGROUND OF THE INVENTION

Wavelength division multiplexed (WDM) optical line systems (OLS) are designed to deliver relatively error free information traffic via, for example, a plurality of intermediate terminals or nodes connecting two end terminals or nodes. Each end terminal typically computes a bit error rate (BER) according to a protocol such as synchronous optical networking (SONET), SDH, gigabit-Ethernet and the like. If a fault occurs between the end nodes (as indicated by a high BER at the receiving end node), the location of the fault cannot be determined and, therefore, all intermediate nodes forming the communication link between the end nodes must be physically examined or tested to determine the location of the fault. Such a fault can be related to a failed hardware component or a fiber failure (fiber cut, cracked or bent fiber and the like).

The time to repair a fault in an optical line system is, therefore, related to the time needed to locate the fault, and this time increases greatly where the number of intermediate nodes is increased.

SUMMARY OF THE INVENTION

Method and apparatus for fault localization in an optical network using time trend correlation of end node performance parameters and intermediate node performance parameters, such as bit error rate and quasi-Q factors, respectively. The method and apparatus are bit-rate and protocol independent, enabling testing for each channel of a diverse dense wavelength division multiplexed traffic system using a single set of hardware.

A method according to an embodiment of the invention comprises: monitoring optical layer performance of at least some of a plurality of network elements (NEs) forming a communications path within a communications network to extract thereby a measure of performance; correlating a time trend for the measure of performance of each NE with a time trend of an end node performance measurement; and identifying an under performing NE using a respective time trend correlation.

BRIEF DESCRIPTION OF THE DRAWINGS

So that the manner in which the above-recited features, advantages and objects of the present invention attained and can be understood in detail, a more particular description of the invention, briefly summarized above, may be had by reference to the embodiments thereof which hare illustrated in the appended drawings. It is be noted, however, that the appended drawings illustrate only typical embodiments of this invention and are therefore not to be considered limiting of this scope, for the invention may admit to other equally effective embodiments.

DETAILED DESCRIPTION OF THE PREFERRED EMBODIMENT

Figure 1:
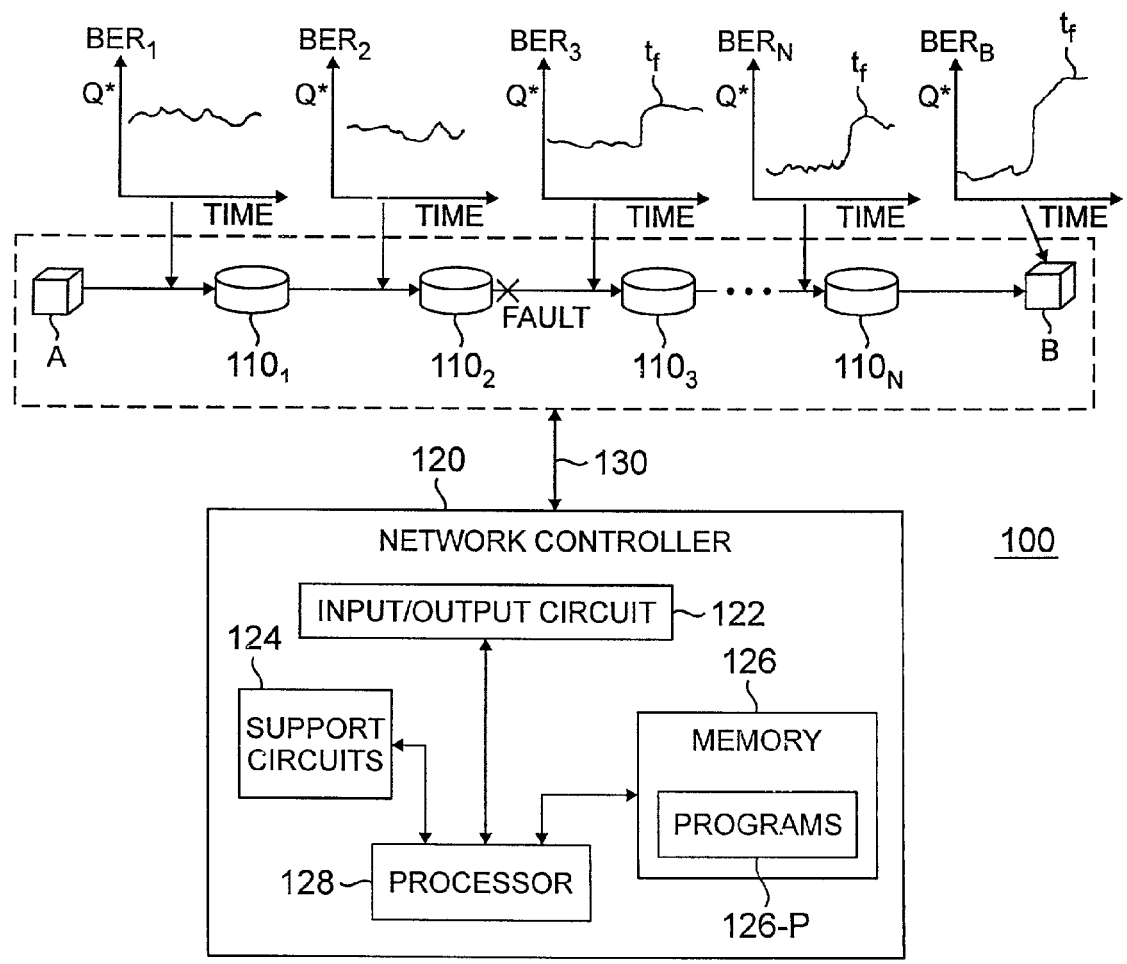
FIG. 1 depicts a high-level block diagram of a communications link and a corresponding graphical representation useful in understanding in the present invention.

FIG. 1 depicts a high-level block diagram of a communications link and a corresponding graphical representation useful in understanding in the present invention. Specifically, the communications link 100 of FIG. 1 is formed between a first or starting end terminal A and a final or ending end terminal B. The communications link 100 comprises an optical line system (OLS) link between terminals A and B that traverses through a first network element $100_1$, a second network element $110_2$, a third network element $110_3$ and so on up to an $n^{th}$ network element $110_n$ (collectively network elements 110). The $n^{th}$ network element provides an output signal that is coupled to the end terminal B.

Each of the network elements 110 forming the communications link 100 may comprise an optical regenerator, an optical amplifier, an optical add-drop multiplexer or other optical network element. In the embodiment of FIG. 1, the communications link comprises a wavelength division multiplex (WDM) optical line system (OLS) which communicates a plurality of channels using WDM techniques from the starting terminal A to the ending terminal B.

Each of the network elements 110 has associated with it means for performing optical performance monitoring providing an indication of, illustratively, an eye-diagram or eye-diagram derived performance metrics, a bit error rate (BER) associated with the data received by the network element and/or other performance measurements or indicia. The BER of each network element is displayed as a function of time. The first network element $110_1$ receives an optical signal having associated with it a corresponding bit error rate $BER_1$, the second network element $110_2$ receives an optical signal having associated with it a corresponding bit error rate $BER_2$, the third network element $110_3$ receives an optical signal having associated with it a corresponding third bit error rate $BER_3$ and so on, up to the $n^{th}$ network element $110_n$ which receives an optical signal having associated with it a corresponding bit error rate $BER_n$. It is also noted that the final network element B receives an optical signal having associated with it a corresponding bit error rate $BER_b$.

In the example of FIG. 1, a fault is indicated proximate the second network element $110_2$. The fault may comprise a fiber cut between the second and third network elements, a problem with the second network element, or other communication problem proximate the second network element $110_2$. For purposes of this discussion, it is assumed that the fault occurred at a time $t_F$. Referring now to the graphical depictions of bit error rate associated with each of the network elements 110, it is noted that those network elements (third through $n^{th}$ and B) downstream from the second network element $110_3$ exhibit a sharp increase in bit error rate at the time $t_F$. In this manner, the optical layer performance monitoring data associated with each of the network elements 110 may be examined to conclusively determine that the fault occurred at a particular time $t_F$, and that the fault is likely proximate the second network element $110_2$, since the optical signal received by network element $110_2$ does not exhibit a corresponding BER spike at the time $t_F$.

Each of the network elements 110 of the system 100 of FIG. 1 has associated with it a means for measuring optical layer performance. Exemplary apparatus adapted to this task will be discussed in more detail below with respect to FIGS. 3 and 4. Briefly, in one embodiment of the invention, for each optical channel to be monitored an eye-diagram is generated. The eye-diagram comprises, illustratively, digitized imagery associated with signals traversing the monitored channel, which digitized imagery may then be used to determine various performance parameters. For example, the shape of the eye-diagram may be monitored to detect various anomalies such as changes in the "shoulders" or other shape-related anomalies indicative of changes in channel performance. These changes in performance may be due to catastrophic events such as fiber optic cuts, as well as less catastrophic events such as component failures or degradation upstream of the monitored channel where, for example, an optical amplifier or other device upstream suffers from excessive thermal energy, deleterious radiation and the like.

Generally speaking, the eye-diagram associated with optical signals passed through a channel may be processed according to a number of algorithms and/or observations to derive performance metrics associated with the operation of the optical channel. In an embodiment of the invention discussed herein, a so-called quasi Q-factor is determined. The quasi-Q factor represents any performance metric (not just Q factor) that may be determined using eye-diagram data. However, other parameters such as jitter and the like may be used in a manner similar to that described with respect to the quasi Q-factor.

The system 100 of FIG. 1 also includes a network controller 120. The network controller 120 comprises a control functionality, which may be implemented in a stand-alone manner, or as part of a network management system. For example, in the case of a synchronous optical network (SONET), the network controller 120 may be included within a SONET element management system (EMS), which is typically used to manage optical network elements (NEs) and may itself be managed by a higher-level network management system (NMS). Thus, the functions of the network controller 120 may be included within an optical EMS such as a SONET EMS, illustratively, an Integrated Transport Management SONET Network Controller (ITM-SNC) manufactured by Lucent Technologies, Inc. of Murray Hill, N.J. The network controller functionality 120 may also be implemented within a network manager such as an Integrated Transport Management Network Manager (ITM-NM), also manufactured by Lucent Technologies Inc. of Murray Hill, N.J. The network controller functionality 120 may also be included within any device capable of performing optical layer management and/or control functions.

The network controller 120 comprises, illustratively, a processor 128 as well as memory 126 for storing various element management programs, control programs, trend analysis programs and other programs adapted to implement the functionality of the network controller 120 and the present invention. The processor 128 cooperates with conventional support circuitry 124 such as power supplies, clock circuits, cache memory and the like as well as circuits that assist in executing the software routines stored in the memory 126. As such, it is contemplated that some of the process discussed herein as software processes may be implemented within hardware, for example, as circuitry that cooperates with the processor 128 to perform various steps.

The network controller 120 also contains input/output (I/O) circuitry 122 that forms an interface between the various functional elements communicating with the network controller 120. For example, in the embodiment of FIG. 1, the network controller 120 communicates with the end node B and some or all of the remaining network elements 110 via a communications link 130.

Although the network controller 120 is depicted as a general-purpose computer that is programmed to perform various functions in accordance with the present invention, the invention can be implemented in hardware as, for example, an application specific integrated circuit (ASIC). As such, the process steps described herein are intended to be broadly interpreted as being equivalently performed by software, hardware, or a combination thereof.

Generally speaking, the invention operates to correlate optical layer performance data measured at least some (preferably all) intermediate nodes within a communication path to protocol specific or optical layer performance data of a final or end-node within the communications path. It is noted that many communications protocols such as SONET and SDH incorporate end-node performance metrics which may be used to determine whether a specified quality of service (QoS) level has been achieved. Thus, a "bit-wise" performance measurement at an end node is typically provided in a communication system. It is noted that optical layer performance metrics may be utilized instead of or in addition to protocol layer performance metrics at an end-node. It is noted that a FibreChannel communication system does not use protocol layer performance measurements. Thus, in a FibreChannel communication system, end-node performance is determined using an optical layer performance metric.

It is noted by the inventors that deviations in time-trend correlation data between end-node and intermediate node performance metrics of, for example, one order of magnitude are quite useful. That is, where a steady state or "good" correlation is achieved, a deviation in that time trend correlation of one order of magnitude has been found to indicate a fault condition or a system degradation condition.

The invention correlates time trend data associated with performance metrics for each of a plurality of intermediate network elements forming a communications path to time trend data associated with a performance metric such as a bit error rate (BER) for a final or destination network element in the communication path. A "good" correlation (as defined by a threshold correlation level) between the time trend performance data of a network element and the time trend performance data of the end network element in the presence of a fault or degradation noted in the end network element performance data indicates that the intermediate network element is likely not proximate the fault or degradation source.

Figure 2:
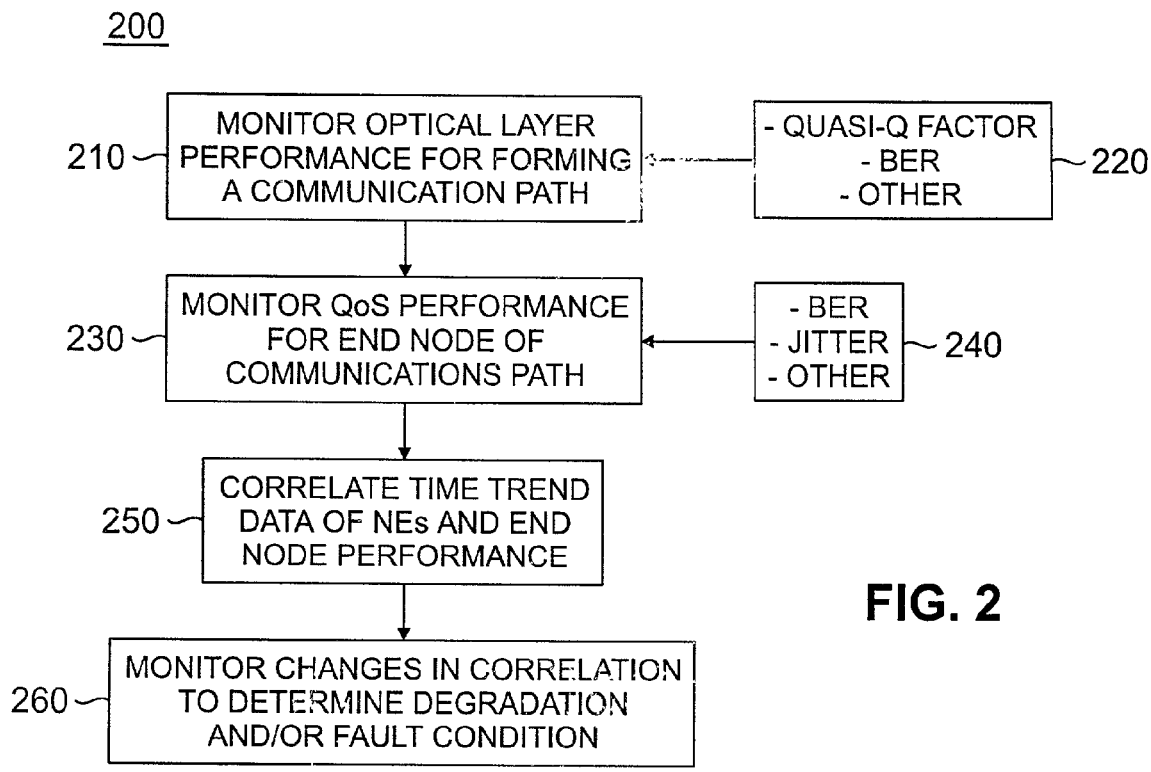
FIG. 2 depicts a flow diagram of a method according to an embodiment of the invention.

FIG. 2 depicts a flow diagram of a method according to an embodiment of the invention. Specifically, the method 200 of FIG. 2 performs various steps useful in quickly isolating and/or predicting a fault condition within a network element that is part of a communication path.

At step 210, the optical layer performance for some (preferably all) of the network elements within a communications path is monitored. That is, referring to box 220, parameters associated with the optical layer performance of, preferably, each of the network elements within a communication path is monitored to derive performance data. The monitored parameters may include data claimed from measured eye-diagrams, such as quasi Q-factor or jitter data, as well as a bit error rate (BER) and/or other parameters.

At step 230, the quality of service (QoS) performance for the end node of a communications path is monitored. For example, referring to box 240, a bit error rate, jitter rate or other quality of service (QoS) parameter associated with the performance of a receiving end node is monitored. The QoS may be determined according to the protocol to which the communications path including the end node or NE adheres to. For example, the QoS level may be determined in a "bit-wise" manner using SONET, SDH, GigabitEthernet or other protocols having appropriate functionality. The QoS may also be determined at the optical layer using, for example, FibreChannel capabilites. In various embodiments of the invention, protocol specific performance monitoring at the signal layer at customer end terminals is monitored, where the customer end terminals are those terminals prior to the point where data traffic is "dropped" to a data traffic client.

At step 250, the time trend data of the network element performance is correlated with the time trend data of the end node performance. That is, assuming that quasi Q-factor or jitter data is determined for intermediate nodes, and BER performance data is determined for a receiving end node, the time trend data associated with the quasi Q-factor (or jitter) time trend data is correlated to the BER time trend data.

At step 260, changes in correlation between the various monitored performance characteristics of the intermediate and end nodes are monitored to determine whether a fault condition exists and/or whether degradation is occurring such that a fault condition may be anticipated. Deviations in time trend correlation data exceeding a threshold level indicative of a "bad" correlation indicate that the intermediate node associated with such deviations is proximate a fault. For example, where an end node has a BER time trend performance measurement that indicates a fault at a time $t_F$, the changes in correlation of intermediate node time trend data is rated. This correlation is performed for each node or channel forming the signal path. The nodes forming the signal path may be then grouped into two sets; namely, those network elements where the time trend data shows good correlation with the BER trend, and those nodes or network elements where the time trend data shows poor correlation with the BER trend. A fault or degradation may be at least initially isolated to the first node or network element along the signal path preceding the node or network element that exhibits poor correlation.

It is noted that an exact dependence of the eye-diagram derived time trend data to the BER time trend data is not strictly needed, since only the correlation between the various time evolutions is used for fault localization. Additionally, by analyzing the trends from the history of faults, specific trends can be identified as being predictive of the onset of specific types of degradation or failure. That is, changes in correlation between time trend data occurring prior to actual faults provide historic data that is useful in predicting subsequent faults. Such fault-predictive changes form "signatures" or "profiles" that may be stored within the memory 126 and compared to present time trend correlation data to determine whether degradations indicative of a subsequent fault condition exist.

It is noted that a decision algorithm for determining an amount of correlation divergence necessary to show poor correlation is selected for different types of networks. That is, one level of correlation may be indicative of an adequate or good correlation in one network, but may be indicative of poor correlation in another network. Appropriate decision levels for the good/poor correlation decision may be determined empirically by operating the network for a period of time and tracking average data trends while the network is operating. Alternatively, the trend data may be mathematically predicted during the design of a particular network. Correlation decision points may be adjusted over time to reflect, for example, empirical data separating more (or less) correlation as being acceptable, changes in weather or solar activity, changes in system components and the like.

Figure 3:
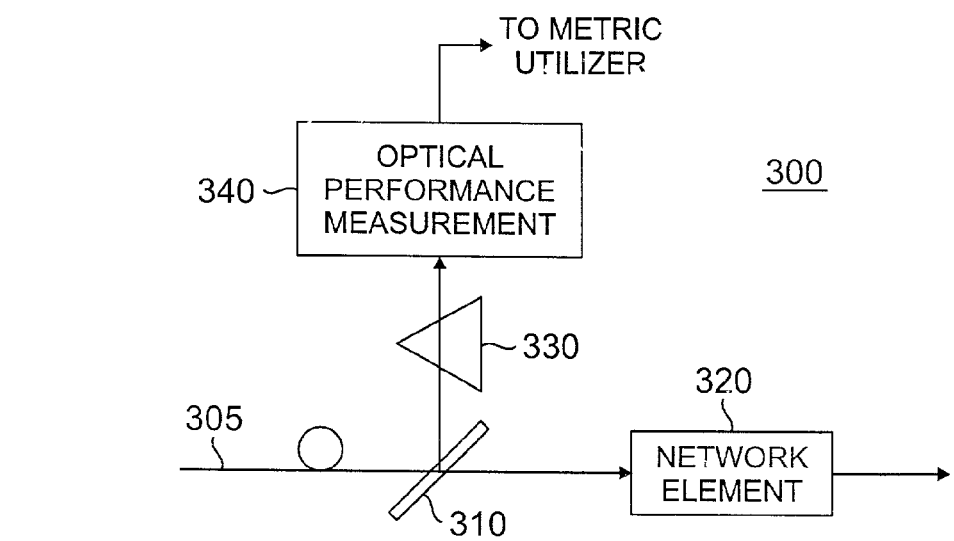
FIG. 3 depicts a high-level block diagram of apparatus suitable for monitoring optical performance at a network element.

FIG. 3 depicts a high-level block diagram of apparatus suitable for monitoring optical performance at a network element. Specifically, an optical fiber 305 delivers an optical signal such as a WDM optical signal to a network element 320. The network element 320 subsequently delivers a resulting optical signal(s) to a further network element or processing device (not shown). Prior to reaching the network element 320, a portion of the optical signal is diverted by a splitter 310. The diverter portion passes through a dispersive element 330 and a single channel associated with the diverted portion is received by an optical performance measurement device 340. The optical performance measurement device may comprise, illustratively, a device adapted to generate an eye-diagram of the received channel and extract therefrom a performance metric such as a jitter or quasi Q-factor performance metric. Data associated with the eye-diagram and/or extracted quasi Q-factor (or other performance metric) is provided to a metric utilizer (not shown), such as the network controller 120 of the system 100 of FIG. 1. It is noted that the optical performance measurement device 340 may communicate directly with the network controller 120 or indirectly through, for example, the network element 320. In either case, at least one of data defining an eye-diagram and data defining a quasi Q-factor or other performance metric extracted from eye-diagram data is provided to the network controller 120 for further processing according to the invention.

Figure 4:
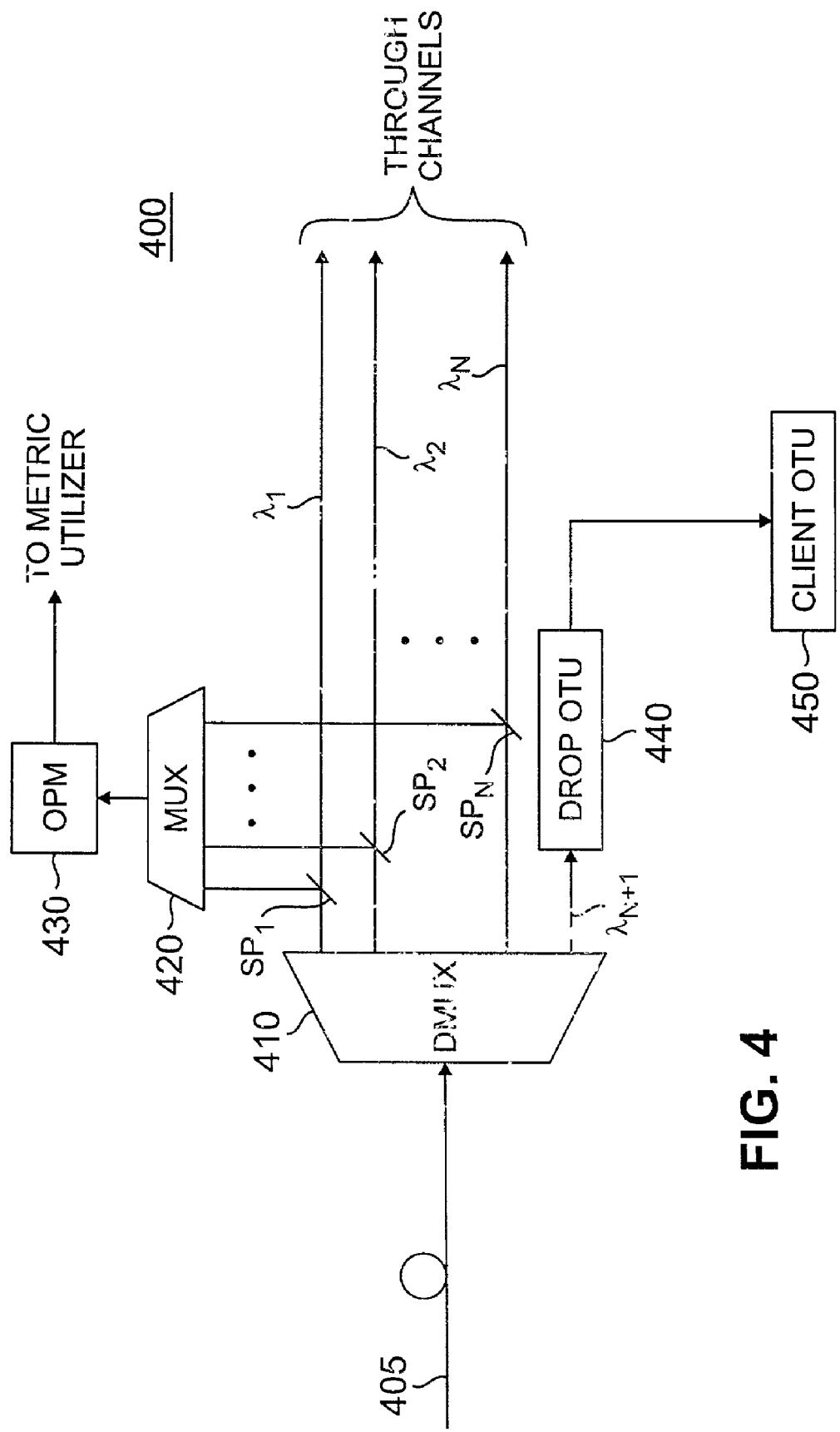
FIG. 4 depicts a high-level block diagram of an optical performance monitoring apparatus adapted for use where a network element comprises a demultiplexer (DMUX) within an optical add-drop multiplexer (OADM)

FIG. 4 depicts a high-level block diagram of an optical performance monitoring apparatus adapted for use where the network element comprises a demultiplexer (DMUX) within an optical add-drop multiplexer (OADM). The apparatus 400 of FIG. 4 depicts an optical fiber 405 that provides a plurality of wavelength specific optical signals within a WDM configuration to the demultiplexer 410. The demultiplexer 410 demultiplexes the WDM signal into a plurality of wavelength specific optical signals $\lambda_1$, $\lambda_2$, and so on up to $\lambda_N$. These N optical signals $\lambda_1$ through $\lambda_N$ are then propagated to further processing elements (not shown) as "through channels." Each of the single channel optical signals $\lambda_1$ through $\lambda_N$ passes through a respective splitter $SP_1$ through $SP_N$, which diverts a respective signal portion to a multiplexer (MUX) 420. The multiplexer 420 operates to select any one of the single channel optical signals for coupling to an optical performance measurement device 430. The optical performance measurement device 430 operates in a similar manner to the optical performance measurement device 340 discussed above with respect to FIG. 3. As with FIG. 3, the optical performance measurement of the selected optical signal portion is coupled to a metric utilizer (not shown).

The apparatus 400 of FIG. 4 also shows an additional single channel optical signal denoted as $\lambda_{N+1}$ which emanates from the demultiplexer 410 and is coupled to a drop OTU 440. The drop OTU passes the single channel optical signal $\lambda_{N+1}$ to a client OTU 450. Thus, the apparatus 400 of FIG. 4 is well suited to use within the context of an optical add-drop multiplexer node within a communications network.

The optical performance measurement apparatus 300, 400 of FIGS. 3 and 4 is adapted to optical layer performance monitoring of an optical signal received or passing through a network element. In alternate embodiments of the invention, protocol specific performance monitoring is utilized prior to dropping data traffic to a client. For example, in the case of the apparatus 400 of FIG. 4, the optical data traffic dropped to the client OTU 450 is monitored at the protocol layer (e.g., SONET, SDH and the like) to derive an error indicative metric in accordance with error correction or other protocol-specific measurements or tools.

While the subject invention is described within the context of optical layer performance monitoring and protocol specific performance monitoring, it is noted that the invention is advantageously bit-rate and protocol independent and is especially well suited to protocol environments in which bit error rate (BER) or other performance metrics are utilized to assess quality of service (QoS) imparted to received data at an end or terminal node or network element. Various protocols including SONET, SDH, Gigabit Ethernet, 10 Gigabit Ethernet, WaveWrapper Protocol, FibreChannel and other protocols are well-suited for use in the present invention. Therefore, the invention enables the testing of each channel of a diverse DWDM traffic using one set of hardware, thereby realizing significant cost savings.

While foregoing description is directed to exemplary embodiments of the present invention, other and further embodiments of the invention may be devised without departing from the basic scope thereof, wherein the scope of the present invention is determined by the claims that follow.

The invention claimed is:

1. A methods comprising:
  monitoring historic and current optical layer performances of at least some of a plurality of network elements (NEs) forming a communications path within a communications network to extract thereby historic and current measures of performances;
  correlating a historic time trend for the historic measure of optical layer performance of each NE with a historic time trend of an end node performance measurement to identify thereby historic fault conditions associated with the monitored NEs;
  identifying a historic underperforming NE using a respective historic time trend correlation;
  correlating a current time trend for the current measure of optical layer performance of each NE with a current time trend of an end node performance measurement to identify thereby future fault conditions associated with the monitored NEs; and
  predicting a future underperforming NE by comparing the current time trend correlation with the historic time trend correlation.

2. The method of claim 1, wherein said measure of optical layer performance comprises performance data extracted from an eye diagram associated with a NE.

3. The method of claim 2, wherein said performance data extracted from an eye diagram comprises quasi-Q factor data.

4. The method of claim 1, wherein said end node performance measurement comprises performance data derived from a communications protocol layer.

5. The method of claim 4, wherein said communications protocol comprises one of a SONET protocol, an SDH protocol and a GigabitEthernet protocol.

6. The method of claim 1, wherein said end node performance measurement is determined using FibreChannel.

7. The method of claim 1, wherein said end node performance measurement comprises bit error rate (BER) data.

8. The method of claim 1, wherein said end node performance measurement comprises jitter data.

9. The method of claim 1, wherein said end node performance measurement comprises an optical layer performance measurement.

10. The method of claim 1, wherein;
  said step of identifying an underperforming NE comprises determining that the correlation between the time trend data of respective optical layer performance and the time trend data of said end node performance measurement has diverged by a threshold amount.

11. The method of claim 10, wherein said threshold amount of divergence comprises an order of magnitude difference from a nominal correlation.

12. The method of claim 10, wherein said threshold amount is calculated as a percentage deviation from a nominal correlation level.

13. The method of claim 12, wherein said nominal correlation level is determined with respect to correlation trend data of said NE.

14. The method of claim 12, wherein said nominal correlation level is determined with respect to correlation trend data of a plurality of NEs.

15. A method, comprising:
  monitoring historic and current optical layer performances for each of a plurality of intermediate network elements (NEs) in a communications path;
  monitoring historic and current quality of service (QoS) performances for an end NE in the communications path; and
  correlating historic time trend data for said monitored historic optical layer performance and said historic QoS performance;
  determining a NE proximate a historic degradation in said communications path using said changes in historic correlation;
  correlating current time trend data for said monitored current optical layer performance and said current QoS performance; and
  predicting a future underperforming NE by comparing the changes in current correlation with historic changes in correlation.

16. The method of claim 15, wherein said measure of optical layer performance comprises performance data extracted from an eye diagram associated with a NE.

17. The method of claim 16, wherein said performance data extracted from an eye diagram comprises quasi-Q factor data.

18. The method of claim 15, wherein the end node performance monitoring comprises at least one of a bit error rate (BER) and a jitter level.

19. The method of claim 15, wherein the end node performance monitoring comprises an optical layer performance measurement.

20. The method of claim 15, wherein:
  said step of determining a NE proximate a degradation comprises determining that the correlation between the rime trend data of respective optical layer performance and the time trend data of said end node QoS performance measurement has diverged by a threshold amount.

21. A network manager for managing a plurality of network elements (NEs) in a communications system, said network manager performing the steps of:
  receiving, from each of a plurality of intermediate NEs in a communications path, historic and current data indicative of respective optical layer performance;

receiving, from an end node in said communications path, historic and current data indicative of a quality of service (QoS) performance level;

correlating, for each of said plurality of intermediate NEs, historic time trend data of respective optical layer performance and historic end node QoS performance;

in response to a degradation in said communications path, using said historic correlations to identify a NE proximate a historic degradation condition;

correlating, for each of said plurality of intermediate NEs, current time trend data of respective optical layer performance and current end node QoS performance; and predicting a NE proximate a future degradation condition by comparing the current correlated time trend data with historic correlated time trend data.

22. The network manager of claim 21, wherein received optical layer performance data comprises performance data extracted from an eye diagram associated with a NE.

23. The network manager of claim 22, wherein said performance data extracted from an eye diagram comprises quasi-Q factor data.

24. The network manager of claim 21, wherein said end node performance data comprises at least one of a bit error rate (BER) and a jitter level.

25. A computer readable medium for storing software instructions which, when executed, perform the steps of:

receiving current and historic optical layer performance data for each of a plurality of intermediate network elements (NEs) in a communications path;

receiving current and historic quality of service (QoS) performance data for an end NE in the communications path;

correlating historic time trend data for said monitored historic optical layer performance data and said historic QoS performance data;

determining a NE proximate a historic degradation in said communications path using said changes in said correlation;

correlating current time trend data for monitored current optical layer performance data and current QoS performance data; and predicting the NE proximate a future degradation by comparing the changes in the current correlation with historic time trend correlation.

* * * * *